United States Patent
Pierre et al.

[11] Patent Number: 5,985,201
[45] Date of Patent: Nov. 16, 1999

[54] METHOD OF INJECTION MOLDING A SUSPENSION OF PARTICLES

[75] Inventors: Peytavin Pierre, Neuilly S/Seine; Quichaud Claude, Ville D'Avray, both of France; Steger Reinhard, Freiburg, Germany

[73] Assignee: Metals Process Systems, France

[21] Appl. No.: 08/854,374

[22] Filed: May 12, 1997

Related U.S. Application Data

[62] Division of application No. 08/568,790, Dec. 7, 1995, abandoned, which is a continuation of application No. 08/118,956, Sep. 9, 1993, abandoned.

[30] Foreign Application Priority Data

Sep. 9, 1992 [FR] France .................................. 9210771

[51] Int. Cl.⁶ .................................................. B29C 45/18
[52] U.S. Cl. ............................ 264/328.18; 264/328.19; 425/560; 425/558
[58] Field of Search ............................... 264/328.1, 108, 264/328.18, 328.19, 328.4, 328.8, 328.17; 425/557, 558, 559, 560, 561, 562, 563, 544, DIG. 228, 585, 586, 587

[56] References Cited

U.S. PATENT DOCUMENTS

| | | |
|---|---|---|
| 2,202,140 | 5/1940 | Burroughs . |
| 2,488,786 | 11/1949 | Watkins ................................ 425/562 |
| 2,965,929 | 12/1960 | Smith ................................... 425/557 |
| 3,191,233 | 6/1965 | Linderoth, Jr. . |
| 3,218,375 | 11/1965 | Hardwick .............................. 425/562 |
| 3,709,644 | 1/1973 | Farrell .................................. 425/560 |
| 3,733,156 | 5/1973 | Garner .................................. 425/562 |
| 3,789,103 | 1/1974 | Sueyoshi et al. .................. 264/328.18 |
| 3,819,313 | 6/1974 | Josephsen et al. .................... 425/560 |
| 4,390,332 | 6/1983 | Hendry ............................... 264/328.8 |
| 4,463,881 | 8/1984 | Dais et al. . |
| 4,521,360 | 6/1985 | Fiorentino ............................ 264/108 |
| 4,600,375 | 7/1986 | Honsho et al. ....................... 425/562 |
| 4,720,364 | 1/1988 | Kauffman et al. .................... 425/558 |
| 5,071,341 | 12/1991 | Poehlsen .............................. 425/561 |

FOREIGN PATENT DOCUMENTS

| | | |
|---|---|---|
| 494304 | 4/1991 | European Pat. Off. . |
| 1438470 | 4/1966 | France . |
| 4018484 | 12/1991 | Germany . |

*Primary Examiner*—Jill L. Heitbrink
*Attorney, Agent, or Firm*—Vanophem Meehan & Vanophem, P.C.

[57] ABSTRACT

A method for injection molding a material consisting of a suspension of particles. The suspension of particles moves through convergent passages in an obturator and an injection channel so that the particles remain in suspension. The press has a head in which a portion of the feed channel and a portion of the injection channel, when the channel is open, is formed by a passage in an externally controlled obturator, the controlled obturator for the feed channel and the one for the injection channel being one and the same or adjacent, and disposed close to the injection orifice.

17 Claims, 4 Drawing Sheets

METHOD OF INJECTION MOLDING A SUSPENSION OF PARTICLES

This is a division of application Ser. No. 08/568,790, filed Dec. 7, 1995, now abandoned, which is a continuation of Ser. No. 08/118,956 filed Sep. 9, 1993, now abandoned.

BACKGROUND OF THE INVENTION

1. Field of the Invention

The invention relates to machines for injecting a material into a mold.

2. Description of the Prior Art

Such a machine is already known, designed for plastics and notably for elastomers, and includes an injection head having:

an axial cavity divided into a cylindrical injection chamber in which a piston is able to move and an injection channel connecting the injection chamber to an orifice for injecting into a mold, the injection channel being convergent at each end, that is on the one hand at its junction with the injection chamber and on the other hand just before the injection orifice, inside a removable nozzle;

a feed channel which opens out into the axial cavity and which is connected at the other end to a plasticizing cylinder which has heating means on the outside, while a worm rotates in its bore;

a non-return ball valve provided on the feed channel, which leaves the latter open when the piston moves In the injection chamber away from the injection orifice, so that the chamber is then fed with elastomer from the plasticizing cylinder, and which closes the feed channel under the effect of the injection pressure when the piston moves towards the injection orifice, so that the elastomer is then expelled through the injection orifice; and a controlled obturator disposed on the injection channel, in order to close off the latter when the piston moves in the injection chamber away from the injection orifice, and to leave the injection channel open when the piston moves in the opposite direction.

The invention aims to provide an injection molding machine which is suitable in particular for a suspension of particles, such as metallic or ceramic particles, and for mixture thereof, of the type described in the documents WO-A-8807902 and WO-A-8807903, and more generally sludges or plastics loaded with materials liable to form deposits.

The inventors have in fact found that, even by eliminating the plasticizing means, conventional injection molding machines, including the one mentioned above, are not capable of functioning correctly with such suspensions of particles.

SUMMARY OF THE INVENTION

The invention proposes an injection molding machine including an injection head having:

an axial cavity divided into an injection chamber in which a piston is able to move and an injection channel connecting the injection chamber to an orifice for injecting into a mold;

a feed channel which opens out into the axial cavity; and a non-return means on the injection channel and feed channel to close off the injection channel and leave the feed channel open when the piston moves in the injection chamber away from the injection orifice so that the axial cavity is then fed with material to be injected, and to open the injection channel and close off the feed channel when the piston moves towards the injection orifice so that the material to be injected is then expelled through the injection orifice.

According to the invention, a portion of the feed channel and a portion of the injection channel, when one or the other is open, is formed by a passage in an externally controlled obturator forming part of the non-return means, the controlled obturator for the feed channel and the one for the injection channel being one and the same or adjacent and disposed close to the injection orifice.

The machine according to the invention has been designed so as to prevent any settling out of the suspension, that is particles which separate from the remainder of the suspension and form deposits which prevent the correct functioning of the injection head.

Thus, unlike the aforesaid prior machine, there is no non-return ball valve in the machine according to the invention, because the particles would be deposited on the tapered seat of the valve, which would end up being blocked to a point where it would no longer be able to ensure, when necessary, the fluid-tight closure of the feed channel.

On the other hand, providing a controlled obturator in the non-return means in the feed channel, the obturator having a passage which forms part of this channel when it is open, makes it possible to avoid the risk of lack of fluid-tightness since closing the obturator amounts to eliminating part of the feed channel.

Naturally, the above explanations for the non-return means in the feed channel also apply to those in the injection channel.

The fact that the obturators for the feed channel and injection channel are one and the same or adjacent means that the volume of the feed channel which is pressurized when material is injected is zero (same obturator) or practically zero (adjacent obturators), which is favorable to the prevention of the phenomenon of settling out. The inventors have in fact found that the repeated pressurization of the same volume of suspension resulted in the latter settling out.

Disposing the obturator or obturators close to the injection orifice is also favorable to the prevention of the phenomenon of settling out, for the same reason, since the closer they are to the injection orifice, the smaller will be the volume of suspension which will be pressurized without having been injected into the mold.

Being close to the injection orifice also offers the advantage of limiting the quantity of material remaining between the injection orifice and the obturator for the injection channel, and therefore limiting the risk that the material coming from this volume may flow outside during the filling stage, since deposits may occur on the external circumference of the injection orifice as a result of such flow, and such deposits may cause a lack of fluid-tightness between the mold and injection head and consequently leaks during the injection stage, which may lead to incomplete filling of the mold.

It will be noted that the term "adjacent" means that the obturators are as close to each other as can be achieved with practical manufacturing constraints which remain reasonable, and that the expression "close to" should be understood in a similar sense. By way of example, it can be noted that the most remote part of the obturator or obturators should be situated less than ten centimeters from the injection orifice and that the volume of material pressurized during injection without being injected should remain less than 30 percent of the total volume pressurized.

According to the preferred characteristics of the invention, each convergent part of the injection channel has a reduction in diameter of less than three millimeters per centimeter of axial length.

These characteristics assist in avoiding a throttle in the injection channel, unlike the prior machine referred to above in which the injection channel has, at its junction with the injection chamber, a tapered narrowing with a high degree of convergence, this narrowing also serving in that case as a stop for the tapered end of the piston.

A deposition of particles would in fact occur at such a throttle or narrowing.

According to other preferred characteristics of the invention, the passage in a controlled obturator, which forms a portion of the injection channel when it is open, is convergent towards the injection orifice.

This makes it possible to increase the length over which the injection channel narrows and therefore to limit its narrowing ratio, so that it is possible to have an injection channel which meets the two requirements mentioned above, that is being both short and with a low narrowing ratio.

According to other preferred characteristics of the invention, the feed channel has a diameter equal to or slightly less than that of the injection chamber, and has no narrowing. This is also favorable in preventing the phenomenon of settling out.

The inventors believe at present that this phenomenon is due essentially to the accelerations and shearing effects to which the suspension is subjected, the fact that the particles have a greater density than the other components of the suspension resulting in the particles, in the event of acceleration, being subjected to different (higher) dynamic forces.

The phenomena of settling would thus be prevented because, with the aforementioned characteristics, on the one hand the diameter of the feed channel is maximized and therefore the velocity of flow in it is minimized so that the accelerations occurring between the time when the suspension is at rest and the time it reaches the maximum flow velocity are also minimized, and on the other hand the local accelerations caused by the narrowings are avoided.

According to other preferred characteristics of the invention, the controlled obturator for the feed channel and the one for the injection channel affords or afford a configuration for cleaning the head, in which both the feed channel and injection channel are open.

This cleaning configuration, into which the injection head is put solely during maintenance operations (and not in normal service), is particularly well suited for carrying out complete cleaning of the injection head, where any deposits which may have been formed therein are totally removed.

According to other preferred characteristics of the invention, the feed channel, in its open configuration, has, when approaching the axial cavity, an oblique length oriented in a direction forming an acute angle with the axial direction of the cavity, and then a vertical length transverse to the axial direction; the vertical length having, at the end opposite to the axial cavity, an extension closed off by a plug.

The oblique length, to which is connected a tube for feeding material to be injected, enables the tube to be connected at a position very close to the injection orifice, without being impeded, for example, by a plate through which the end of the injection head has to pass to reach the mold, and at the same time complementary means for cleaning the injection head can be provided simply and conveniently.

In a first preferred and particularly compact embodiment, the controlled obturator for the feed channel and the one for the injection channel are combined in a single rotary three-way obturator affording a filling position in which the injection channel is closed off while the feed channel is open, and an injection position in which the injection channel is open and the feed channel closed off.

The three-way obturator preferably has a T-shaped passage with a diametral portion between first and second ways and a radial portion between the diametral portion and a third way. In the filling position the passage situated between the first and third ways forms part of the feed channel, the second way being closed off while the radial portion is coaxial with the injection channel with the third way facing the injection chamber. In the injection position the third way is closed off while the diametral portion is coaxial with and forms part of the injection channel, with the first way facing the injection chamber and the second way facing the injection orifice. In a cleaning position, none of the first, second and third ways is closed off, and the passage situated between the third and second ways forms part of the feed channel while the diametral portion is coaxial with and forms part of the injection channel, with the second way facing the injection chamber and the first way facing the injection orifice.

With these characteristics, the obturator has self-cleaning properties. It can be seen in fact that each part of the passage forming a recess—respectively in the filling position the part of the diametral portion situated between the radial portion and the second way, and in the injection position the radial portion—is in the opposite position, on the path over which the suspension flows. Consequently, any deposits formed in a recess at one of the positions would be entrained by the flow of suspension in the other position.

In a second preferred embodiment, though less economical than the previous one, the controlled obturator for the feed channel and the one for the injection channel are separate, the obturator for the injection channel being rotary and with two ways, between which it has a diametral passage.

There is therefore no common part between the feed channel and injection channel (in the previous embodiment, the part of the diametral portion situated between the first way and the radial portion is common), and there is therefore no need to make a compromise between contradictory requirements, and notably on the one hand for the feed channel to have a diameter as close as possible to that of the injection chamber and on the other hand for the injection channel to converge in the obturator passage.

Preferably:

the obturator for the feed channel is disposed at the junction between the oblique length, vertical length and extension, is rotary, with three ways, and affords a filling position in which the feed channel is open and communicates with the extension, and an injection position in which the feed channel is closed;

the obturator for the feed channel has a Y-shaped passage with a diametral portion between first and second ways, and a radial portion between the diametral portion and a third way; in the filling position the passage situated between the third and second ways forms part of the feed channel, the diametral portion being coaxial with the vertical length and extension with the first way facing the extension and the second way facing the axial cavity, while the radial portion is coaxial with the oblique length with the third way facing the oblique length; and in the injection position the diametral portion is transverse to the vertical length and extension, with the radial portion above the diametral portion;

the injection head has a transmission between the rotary obturator for the feed channel and the one for the injection channel, adapted so that, when the diametral passage in the obturator for the injection channel forms part of the latter, the obturator for the feed channel is in an injection position in which it closes off this channel, and so that, when the obturator for the injection channel closes off the latter, the obturator for the feed channel is in a filling position in which the channel is open; and the injection head includes means for disconnecting the transmission, so that the obturators respectively for the feed channel and for the injection channel afford a cleaning configuration in which both the feed channel and injection channel are open.

According to other preferred characteristics, the piston has a concave surface facing the injection channel, with a projecting portion at least at the bottom.

The end of the piston thus forms a kind of scoop which is able to scrape off any deposits which may have formed, notably at the bottom of the region in which the feed channel opens out into the axial cavity, the particles scraped off being recovered in the hollow of the "scoop" and spontaneously remixing with the suspension coming from the feed channel during the ensuing filling.

According to other preferred characteristics of the invention, the machine also has a unit for feeding material to be injected, connected to the injection head by a tube which is connected to the feed channel, the feed unit having a forced metering pump between a hopper containing material to be injected and a connection to the tube, the forced metering pump, preferably located adjacent to the hopper and underneath it, having a cylinder with a bore divided into a metering chamber in which a piston is able to move and a first duct situated between the metering chamber and the connection, a second duct connecting to the first duct a connection provided for the hopper. A rotary three-way obturator is disposed at the junction between the first and second ducts, the obturator affording an inlet position in which it connects the metering chamber to the second duct while it isolates the metering chamber from the first duct, and a discharge position in which it connects the metering chamber to the first duct while it isolates the metering chamber from the second duct.

It will be noted that the feed unit is particularly suited to the machine which has just been disclosed, but that it can be used independently, notably with machines suitable for injecting plastics.

A description of two example embodiments of the invention will follow, given below by way of illustration and nonlimitatively, with reference to the accompanying drawings appended hereto.

DETAILED DESCRIPTION OF THE PREFERRED EMBODIMENT

Figure 1:
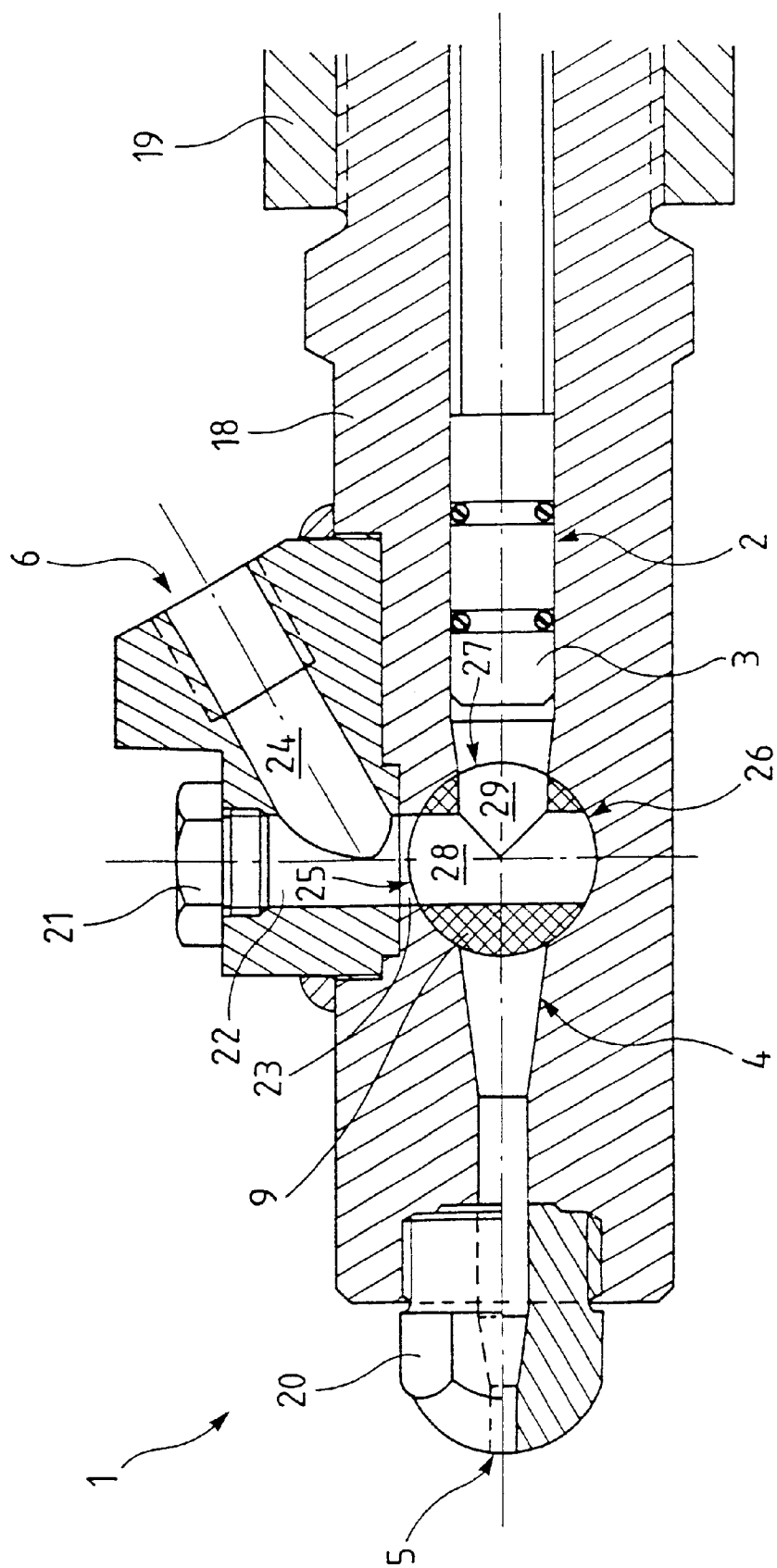
FIG. 1 is an elevational, sectional view longitudinally through an injection head on a machine according to the invention for injecting a suspension of particles, in the configuration which it adopts at the start of the filling stage.
Figure 2:
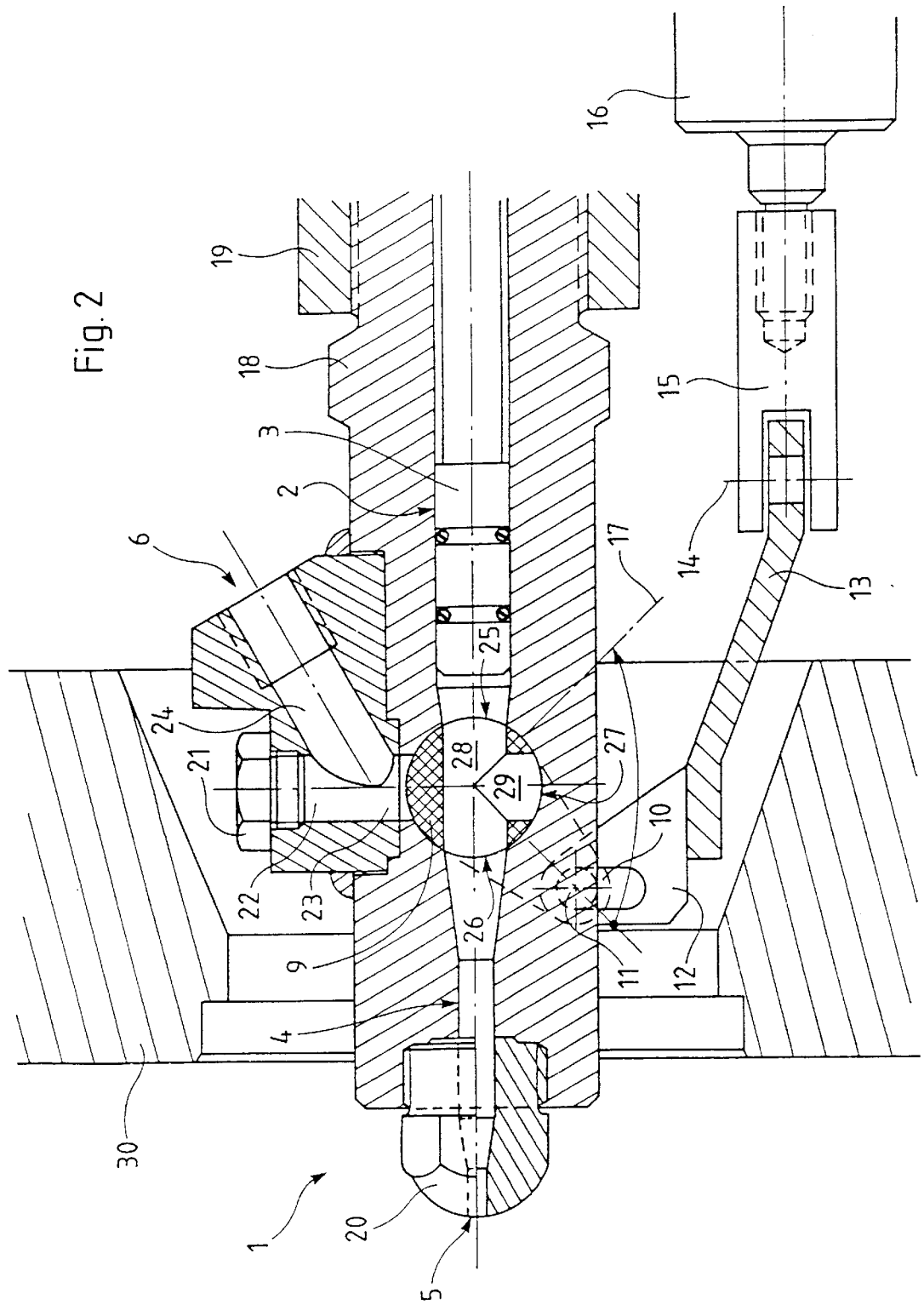
FIG. 2 is a view similar to FIG. 1, the injection head being shown in the configuration which it adopts at the end of the injection stage.

As shown in FIGS. 1 and 2, an injection head 1 has an axial cavity divided into a cylindrical injection chamber 2 in which a piston 3 is able to move, and a convergent injection channel 4 which connects the cylindrical injection chamber 2 to an orifice 5 for injecting into a mold.

To feed the axial cavity, the head 1 has a feed channel 6 connected on the outside to one end of a flexible tube 7, the other end of which (see FIGS. 4 and 5) is connected to a unit 8 for feeding suspensions to be injected.

In the configuration shown in FIG. 1, the portion of the feed channel 6 situated at its end nearest to the axial cavity is formed by a passage in a rotary obturator 9 which then closes off the injection channel 4. On the other hand, in the configuration shown in FIG. 2, the feed channel 6 is closed off by the obturator 9, a passage in which forms a portion of the injection channel 4.

The configuration shown in FIG. 1 is the one adopted by the injection head 1 at the start of a stage of filling with suspension to be injected, the piston 3 then moving to the right in FIG. 1 while the suspension flows towards the axial cavity through the feed channel 6. After the piston 3 has covered a predetermined distance, it stops and the obturator 9 is rotated so as to be put in the position shown in FIG. 2. The piston 3 then moves in the injection chamber 2 towards the left, that is to say it moves towards the injection orifice 5, through which some suspension is then expelled. When the piston 3 has reached the position illustrated in FIG. 2, the injection into the mold has finished.

It can be seen that the rotary obturator 9 serves both as an obturator for the injection channel 4 and as an obturator for the feed channel 6, as well as a non-return means provided on the injection channel 4 in the configuration in FIG. 1, and as a non-return means provided on the feed channel 6 in the configuration in FIG. 2.

The means for controlling the rotary obturator 9 are shown solely in FIG. 2. They include a lever 10 fixed to the rotary obturator 9 and provided, at the end opposite to the latter, with a finger 11 engaged in a vertical slot in a bracket 12 secured to one end of a linkage 13, the other end of which is articulated about an axis 14 on a fork joint 15 fixed to a stem 16 of an actuator secured to the injection head 1.

In order to move the rotary obturator 9 from the position in FIG. 2 (the injection position) to the position in FIG. 1 (the filling position), the actuator is operated to make the stem 16 move along its axis towards the right in FIG. 2, until the lever 10 has reached the position shown diagrammatically by the axis 17.

Naturally, in order to move from the filling position to the injection position, a similar procedure is followed, but in the opposite direction, by making the stem 16 move towards the left in FIG. 2.

The bracket 12 is held between the lever 10 and a removable pin in the finger 11. It is possible to release the lever 10 from the other components controlling the rotary obturator 9, by removing the pin and tilting the lever 10 and bracket 12 about the axis 14 until the finger 11 is disengaged from the slot in the bracket 12. After carrying out this removal, it is possible to move the rotary obturator 9 into a cleaning position in which the lever 10 is in a position diametrically opposite to the one shown in FIG. 2. It can be seen that, in this position, both the injection channel 4 and feed channel 6 are open.

More precisely, to carry out this cleaning, the end of the injection head 1 is removed, disconnecting a body 18 from a cylinder 19 by unscrewing, the piston 3 then being extracted from the injection chamber 2. A nozzle 20, at the end of which is the orifice 5, is also removed, as well as a plug 21 which closes off an extension 22 of the vertical length 23 of the feed channel 6, the vertical length to which is connected an oblique length 24 forming an acute angle with the direction of the axial cavity.

After effecting these dismantlings, fluid is directed to the rotary obturator 9 which has been put in the cleaning position, through the injection chamber 2, feed channel 6 and extension 22, the cleaning fluid emerging through the injection channel 4. By proceeding in this manner, any deposits of particles which might have formed during the operation of the injection head 1 are effectively eliminated.

The injection head can also be cleaned without dismantling it, simply by completely withdrawing the piston 3 from the injection chamber 2 and injecting cleaning fluid, notably water or another suitable solvent, into both the injection chamber 2 and the extension 22.

In order to effect the various connections which have just been explained, the rotary obturator 9 has a T-shaped passage between the three ways 25, 26 and 27, this passage having a diametral portion 28 between the ways 25 and 26 and a radial portion 29 between the portion 28 and the way 27.

In the filling position (FIG. 1), the passage situated between the ways 25 and 27 forms part of the feed channel 6, the way 26 being closed off while the portion 29 is coaxial with the injection channel 4, with the way 27 facing the injection chamber 2.

In the injection position (FIG. 2) the way 27 is closed off while the diametral portion 28 is coaxial with and forms part of the injection channel 4, with the way 25 facing the injection chamber 2 and the way 26 facing the orifice 5.

Finally, in the cleaning position, none of the ways 25, 26 and 27 is closed off, the passage situated between the ways 27 and 26 forming part of the feed channel 6 while the diametral portion 28 is coaxial with and forms part of the injection channel 4, with the way 26 facing the injection chamber 2 and the way 25 facing the orifice 5.

It will be observed that, in the filling position (FIG. 1), the part of the diametral portion 28 situated between the way 26 and the radial portion 29 forms a recess in which suspension particles may be deposited, and that the same applies to the radial portion 29 in the injection position (FIG. 2).

Each of these recesses will however be cleaned when the rotary obturator 9 moves into the other position since the recess which exists in the filling position forms part of the injection channel 4 in the injection position, and since the recess which exists in the injection position forms part of the feed channel 6 in the filling position, so that any particles which have accumulated in a recess in one of the positions are eliminated from it in the other position by the flow of the suspension.

In the example illustrated, the injection head 1 is able to move along its axis so that the circumference of the orifice 5 is able to interact in a fluid-tight manner with a mold into which the suspension is injected, the head moving away from the mold after injection.

Thus the complete cycle is as follows: with the head in a position away from the mold and the rotary obturator 9 in the filling position and the piston 3 as close as possible to the orifice 5 (FIG. 1), the head 1 is fed with suspension to be injected while the piston 3 withdraws, the volume of the injection chamber 2 left clear by the withdrawal of the piston 3 filling with suspension, which enters the head through the feed channel 6; when the head 1 is full, it moves forward until the circumference of the orifice 5 is in contact with the mold; the rotary obturator 9 then moves into the injection position and the piston 3 moves to its maximum forward position (FIG. 2), the mold then receiving a volume of suspension equal to the volume by which the injection chamber 2 has decreased because of the movement of the piston 3; this position is maintained (held under pressure) until the suspension in the mold has solidified or set; the injection head then withdraws, the rotary obturator 9 returns to the filling position and the cycle begins again.

If necessary, after solidification of the suspension in the mold and before withdrawal of the head 1, a slight withdrawal of the piston 3 can be provided for in order to prevent any suspension from flowing through the orifice 5 when the circumference of the latter is no longer in contact with the mold.

As can be seen in FIG. 2, the machine has, close to the mold, a relatively thick plate 30, through an orifice in which the head 1 has to pass in order to reach the mold.

In spite of the plate 30, it has been possible to dispose the rotary obturator 9 close to the orifice 5, because of the oblique portion 24 of the feed channel 6, which has made it possible to dispose the rotary obturator 9 in the space occupied by the plate 30 (see FIG. 2).

In the example illustrated, the machine has a frame sized for the injection of a plastic, so that it can also be used for this material by changing the injection head. Where a machine is manufactured which is intended solely for the injection of a suspension, it is possible to considerably reduce the thickness of the plate 30 and to bring the mold much closer to it, which would make it possible on the one hand to bring the rotary obturator 9 and nozzle 20 closer together and on the other hand to shorten the latter, in order to reduce still further the distance between the obturator and the injection orifice 5.

Figure 3:
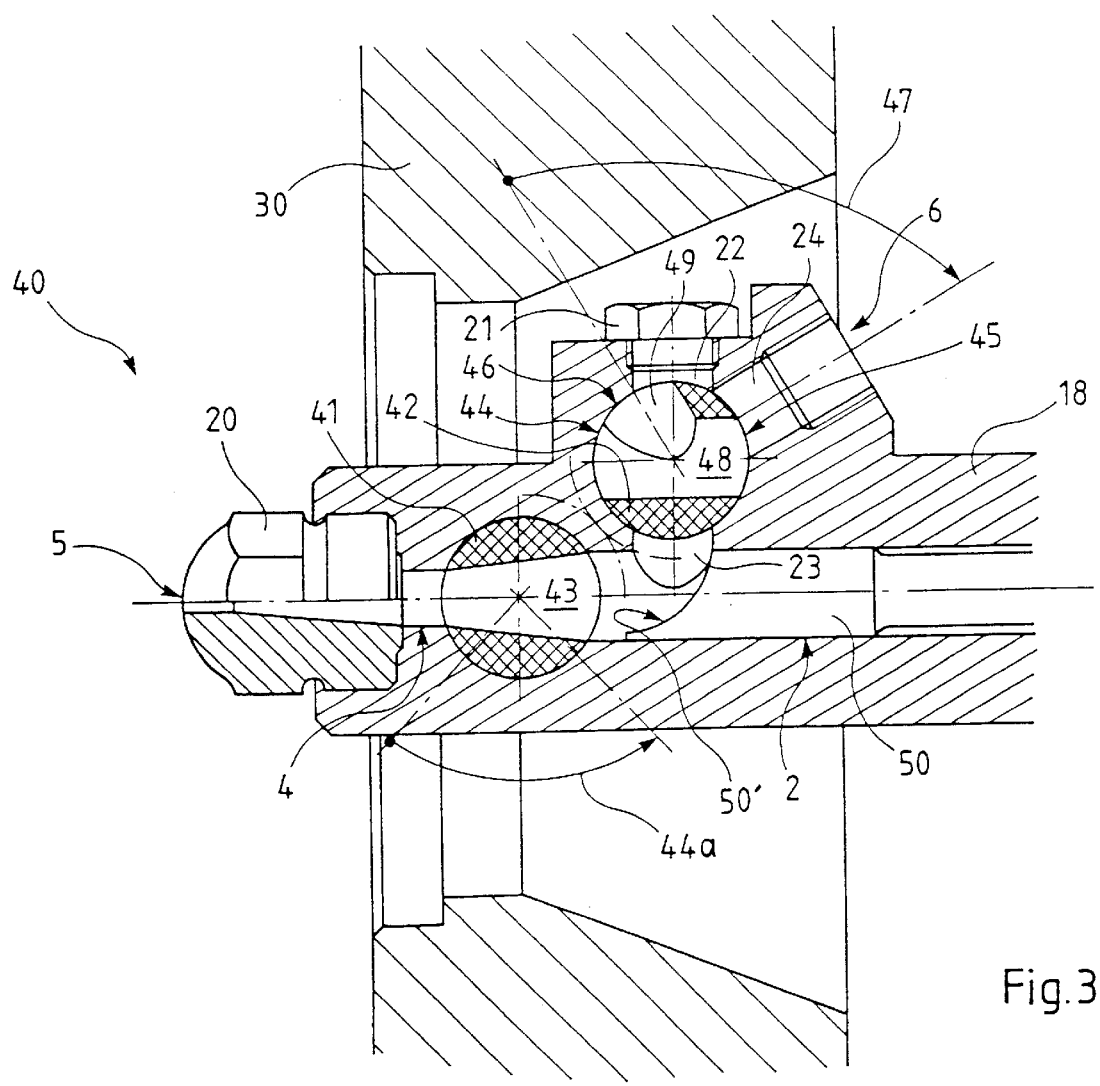
FIG. 3 shows, in a similar fashion to FIG. 2, a variant embodiment of the injection head.

In the variant shown in FIG. 3, a head 40, both in its structure and in its functioning, is similar to the injection head 1 (the same reference numerals have been kept for similar components), but the controlled obturator 9 common to the injection channel 4 and feed channel 6 has been replaced by separate obturators, respectively 41 for the injection channel 4 and 42 for the feed channel 6.

The rotary obturator 41 for the injection channel 4 has two ways, between which it has a diametral passage 43. In the position illustrated, the obturator 41 leaves the injection channel 4 open, of which the passage 43 forms a portion. In order to close off the injection channel 4, the obturator 41 can be rotated through 90°, as shown by the arrow 44a.

The rotary obturator 42 is disposed at the junction between the oblique length 24, vertical length 23, and extension 22. It has a Y-shaped passage with three ways 44, 45 and 46. In the position illustrated in FIG. 3 (the injection position) the obturator 42 closes off the feed channel 6. If this obturator is rotated through 90°, as shown by the arrow 47, the obturator 42 will be in a filling position in which the feed channel 6 will be open and communicates with the extension 22.

The Y-shaped passage in the obturator 42 includes a diametral portion 48 between the ways 44 and 45 and a radial portion 49 between the diametral portion 48 and the way 46.

In the filling position, the passage situated between the ways 46 and 45 forms part of the feed channel 6, the diametral portion 48 being coaxial with the vertical length 23 and extension 22, with the way 44 facing the extension 22 and the way 45 facing the axial cavity, while the portion 49 is coaxial with the oblique length 24 with the way 46 facing the latter.

In the injection position (FIG. 3) the diametral portion 48 is transverse to the length 23 and extension 22, with the radial portion 49 above the diametral portion 48.

A transmission is provided between the obturators 41 and 42, in this case formed by segment gears, of which only the pitch lines are illustrated, so that, when the diametral passage 43 in the obturator 41 forms part of the injection channel 4, then the obturator 42 is in the injection position (FIG. 3), and so that, when the obturator 41 closes off the injection channel 4, then the obturator 42 is in the filling position.

The transmission between the obturators 41 and 42 is adapted so that, when the obturator 41 rotates as shown by the arrow 44*a*, then the obturator 42 rotates as shown by the arrow 47 (moving from the injection position to the filling position), and likewise in the opposite direction (moving from the filling position to the injection position).

The transmission between the obturators 41 and 42 is designed to be disconnected, in this case by removing the pin which connects one of the segments to the obturator 42, which enables the head 40 to be placed in a cleaning position in which the obturator 41 is in the position illustrated and the obturator 42 in the position in which it leaves the feed channel 6 open.

The control for the obturators 41 and 42 is not shown, but is similar to the one for the obturator 9, a lever similar to the lever 10 being mounted on the obturator 41.

In the head 40, the piston 3 is replaced by a piston 50, which has at its end a concave surface 50' facing the injection channel, with a portion which projects at least at the bottom.

The concave surface 50' at the end of the piston 50 thus forms a kind of scoop which is able to scrape off any deposits which may have formed at the bottom of the region in which the feed channel 6 opens out into the axial cavity.

In order to keep the projecting portion at the bottom, means are provided for preventing the piston 50 from rotating on itself.

It will be observed, both in the head 1 and in the head 40, that each convergent part of the injection channel has a particularly low narrowing ratio, in this case less than 3 mm per cm of axial length. It will also be noted that the diametral portions 28 and 43 of the obturators 9 and 41, which form a portion of the injection channel 4 when it is open, are each convergent towards the injection orifice.

It will also be noted that the feed channel 6 has a diameter which is very slightly less than that of the injection chamber 2, and that it has no narrowing.

Figure 4:
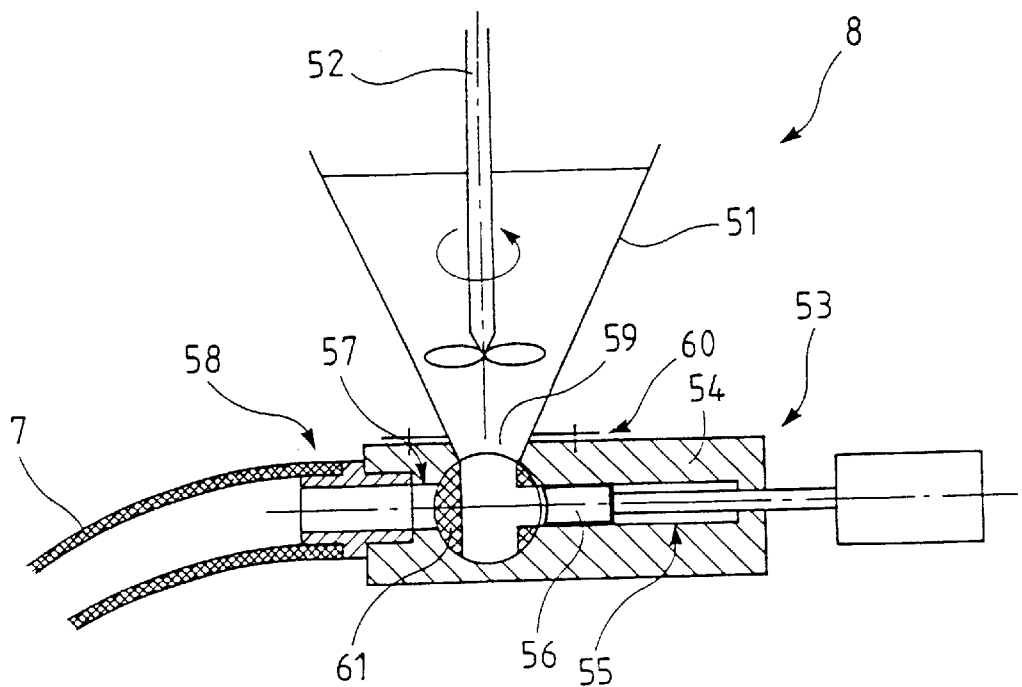
FIGS. 4 and 5 are elevational, sectional views longitudinally through a unit for feeding the head, the unit being shown in FIG. 4 in the configuration which it adopts at the start of an inlet stage, and in FIG. 5 in the configuration at the start of a discharge phase.
Figure 5:
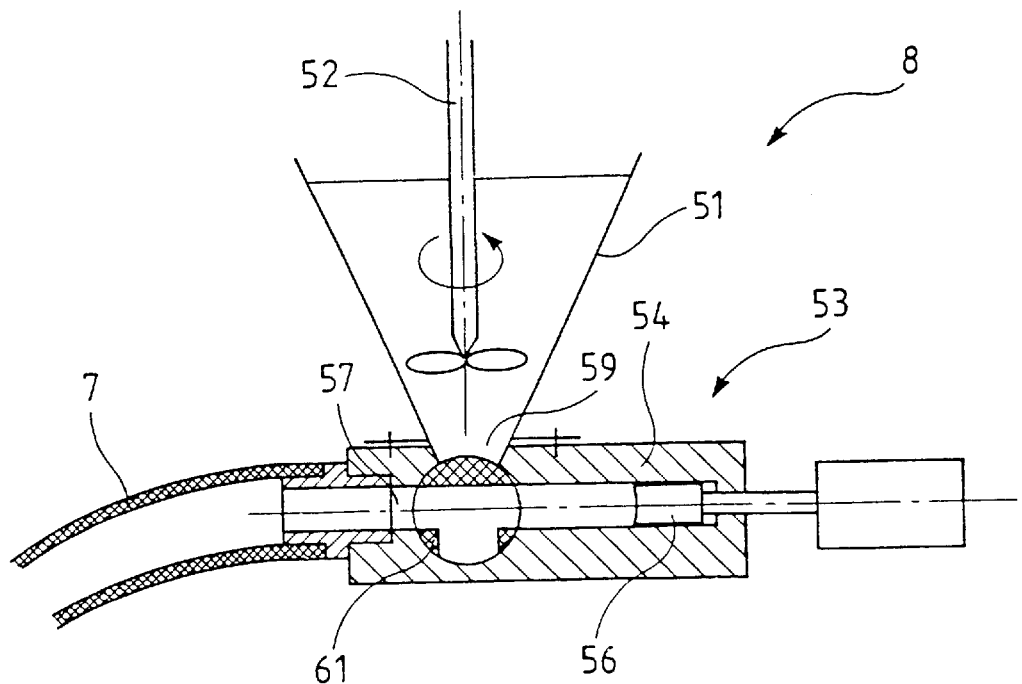

As shown in FIGS. 4 and 5, the suspension feed unit 8 has a hopper 51 containing suspension to be injected, with an agitator 52 which rotates in it in order to keep the suspension homogeneous. Between the hopper 51 and the flexible tube 7 a forced metering pump 53 is provided, which has a cylinder 54 with a bore divided into a metering chamber 55, in which a piston 56 is able to move, a duct 57 situated between the chamber 55 and a connection 58 to the tube 7, and a duct 59 connecting a connection 60 provided for the hopper to the duct 57.

A rotary three-way obturator 61 is disposed at the junction between the ducts 59 and 57. It affords an inlet position (FIG. 4) in which it connects the metering chamber 55 to the duct 59 while it isolates the metering chamber 55 from the duct 57, and a discharge position (FIG. 5) in which it connects the metering chamber 55 to the duct 57 while it isolates the metering chamber from the duct 59.

The operating cycle is as follows: the obturator 61 is placed in the inlet position with the piston 56 moved forward to the maximum extent (FIG. 4); the piston 56 withdraws in a predetermined manner so that a predetermined volume (one portion) of suspension contained in the hopper 51 enters the cylinder 54; the obturator 61 is rotated in order to put it in the discharge position (FIG. 5); and the piston 56 is moved forward in order to discharge the predetermined volume of suspension through the tube 7; the obturator 61 is rotated in order to return it to the filling position; and the cycle recommences.

It will be observed that the forced metering pump 53 has a structure and mode of operation entirely similar to those of the head 1.

In the machine illustrated, the piston 3 or 50 has been allowed to withdraw in the stages when the head is filled under the effect of the forward movement of the piston 56. Equally well the pistons 56 and 3 or 50 could be controlled so as to obtain a similar functioning.

The advantage in using the forced metering pump 53 is to avoid filling the head 1 or 40 by suction of the suspension, and having a risk of cavitation and formation of air bubbles within the suspension to be injected; and also to very accurately apportion the volume of suspension which goes into the injection head.

When it is not desired to effect such an apportioning and there is no risk of cavitation, the tube 7 may be connected directly to the hopper 51.

The injection machine described above has been designed especially for suspensions of particles, but it can be suited to other materials to be injected.

This machine may notably be used for implementing cryogenic injection processes or pressure die-casting processes, where solidification of the part in the mold or mold cavity is obtained by setting the suspension or injected or cast material in them, but it is also suited to other injection processes.

It goes without saying that the foregoing description has been given by way of non-limiting example and that numerous variants may be put forward without departing from the scope of the invention.

What is claimed is:

1. A method for molding a material consisting of a suspension of particles, said method comprising the step of injecting said material into a mold by using a molding machine, said step of injecting comprising the steps of:

selectively positioning a three-way obturator having first, second, and third ways of an injection head of said machine, said injection head further having a feed channel, an injection chamber, a piston, an injection channel and an orifice, such that said first way communicates with said feed channel, said second way is closed, and said third way communicates with said injection chamber so as to create a passage between said feed channel and said injection chamber;

feeding said material consisting of said suspension of particles through said feed channel into said injection chamber such that said particles remain in suspension;

prohibiting a flow of said material consisting of said suspension of particles into said injection channel by blocking said injection channel with said three-way obturator during said step of feeding said material consisting of said suspension of particles;

selectively positioning said three-way obturator such that said first way communicates with said injection chamber, said second way communicates with said injection channel, and said third way is closed so as to create a passage between said injection channel and said injection chamber, said injection chamber having a convergent passage converging in a direction towards said three-way obturator, said passage of said three-way obturator created between said injection channel and said injection chamber having a convergent portion converging in a direction towards said injection channel, and said injection channel having a convergent passage converging in a direction towards said orifice of said injection head;

injecting said material consisting of said particles in suspension using said piston, from said injection chamber into said injection channel, such that said particles remain suspended in said material; and prohibiting a flow of said material consisting of said suspension of particles into said feed channel by blocking said feed channel with said three-way obturator during said step of injecting said material consisting of said suspension of particles.

2. The method according to claim 1 wherein the step of selectively positioning said first way of said three-way obturator to communicate with said feed channel further comprises the step of selecting said feed channel to have a portion having a diameter less than or equal to a diameter of said injection chamber.

3. The method according to claim 1 wherein the step of selectively positioning said first way of said three-way obturator to communicate with said feed channel further comprises the step of selecting said feed channel to have a first portion oriented to form an acute angle with an axial direction of said injection chamber and wherein said feed channel has a second portion intermediate said first portion and said injection chamber, said second portion being oriented transverse to said axial direction of said injection chamber, said second portion having, at an end opposite said injection chamber, a closable extension.

4. A method according to claim 1 further comprising the steps of:

solidifying said material consisting of said suspension of particles within said mold after said suspension of particles is injected; and withdrawing said piston a predetermined distance prior to withdrawing said injection head from said mold.

5. A method according to claim 1 wherein said step of feeding said material consisting of said suspension of particles consists of the step of feeding a suspension of metallic particles.

6. A method according to claim 1 wherein said step of feeding said material consisting of said suspension of particles consists of the step of feeding a suspension of ceramic particles.

7. A method according to claim 1 wherein said step of feeding said material consisting of said suspension of particles consists of the step of feeding a suspension of metallic and ceramic particles.

8. A method according to claim 1 wherein said step of feeding said material consisting of said suspension of particles consists of the step of feeding a sludge in which particles are suspended.

9. A method according to claim 1 wherein said step of feeding said material consisting of said suspension of particles consists of the step of feeding a plastic in which filler particles are suspended.

10. A method according to claim 1 wherein said step of feeding said material consisting of said suspension of particles consists of the step of feeding a suspension of particles liable to form deposits.

11. A method for operating a molding machine having an injection head for injecting a material consisting of a suspension of particles, said injection head comprising an axial cavity divided into a cylindrical injection chamber and an injection channel, said cylindrical injection chamber having a piston reciprocally received therein; an injection orifice complementary with said injection channel, said injection channel having one end opening into said injection orifice for injecting said material from said cylindrical injection chamber into a mold; a feed channel having one end spaced from said injection channel, said one end of said feed channel communicating with said axial cavity; an obturator disposed between said injection channel and said feed channel for selectively obturating said injection channel and opening said feed channel to communicate with said injection chamber when said piston moves within said cylindrical injection chamber in a first direction away from said injection orifice such that said axial cavity is supplied with said material consisting of said suspension of particles, said obturator further selectively opening said injection channel and obturating said feed channel when said piston moves in a second direction towards said injection orifice such that said material consisting of said particles in suspension is then expelled through said injection orifice; said obturator located adjacent said injection orifice and having a passage formed therein, said passage of said obturator selectively forming a portion of said feed channel when said obturator is oriented in a first position and forming a portion of said injection channel when said obturator is oriented in a second position, said passage of said obturator being convergent when said obturator is oriented in said second position; said injection channel further having a converging passage in a direction toward said injection orifice communicating with said one end of said passage when said obturator is oriented in said second position; and wherein said convergent passage of said injection channel and said convergent passage of said obturator each converge in diameter less than about three millimeters per centimeter of axial length, said method comprising the steps of:

placing said obturator in said inlet position;

locating said piston forward in said injection chamber;

withdrawing said piston in a predetermined manner to obtain a predetermined volume of said material consisting of said suspension of particles in said injection chamber;

rotating said obturator to said second position; and moving said piston forward to discharge said predetermined volume of said material consisting of said particles in suspension therein.

12. A method according to claim 11 wherein said step of withdrawing said piston to obtain a predetermined volume of said material consisting of said particles in suspension further comprises the step of withdrawing said piston to obtain a predetermined volume of a suspension of metallic particles.

13. A method according to claim 11 wherein said step of withdrawing said piston to obtain a predetermined volume of said material consisting of said suspension of particles further comprises the step of withdrawing said piston to obtain a predetermined volume of a suspension of ceramic particles.

14. A method according to claim 11 wherein said step of withdrawing said piston to obtain a predetermined volume of said material consisting of said particles in suspension further comprises the step of withdrawing said piston to obtain a predetermined volume of a suspension of metallic and ceramic particles.

15. A method according to claim 11 wherein said step of withdrawing said piston to obtain a predetermined volume of said material consisting of said suspension of particles further comprises the step of withdrawing said piston to obtain a predetermined volume of a sludge in which particles are suspended.

16. A method according to claim 11 wherein said step of withdrawing said piston to obtain a predetermined volume of said material consisting of said suspension of particles further comprises the step of withdrawing said piston to obtain a predetermined volume of a plastic in which filler particles are suspended.

17. A method according to claim 11 wherein said step of withdrawing said piston to obtain a predetermined volume of said material consisting of said suspension of particles further comprises the step of withdrawing said piston to obtain a predetermined volume of a suspension of particles liable to form deposits.

* * * * *